United States Patent [19]

Sakamoto et al.

[11] Patent Number: 4,690,432
[45] Date of Patent: Sep. 1, 1987

[54] AUTOMOBILE INSTRUMENT CLUSTER TILTABLE WITH A STEERING COLUMN

[75] Inventors: Toshinori Sakamoto, Higashihiroshima; Isao Hirashima; Seiichi Tsuji, both of Hiroshima, all of Japan

[73] Assignee: Mazda Motor Corporation, Hiroshima, Japan

[21] Appl. No.: 790,515

[22] Filed: Oct. 23, 1985

[30] Foreign Application Priority Data

Oct. 24, 1984 [JP] Japan ................... 59-223167
Oct. 24, 1984 [JP] Japan ............... 59-160800[U]
Nov. 5, 1984 [JP] Japan ............... 59-168107[U]

[51] Int. Cl.⁴ ............................. B62D 1/18
[52] U.S. Cl. .................... 280/775; 180/90; 74/493
[58] Field of Search ............ 180/90, 334, 326; 280/775, 779; 74/493

[56] References Cited

U.S. PATENT DOCUMENTS 3,803,939  4/1974  Schenten ................. 74/493
4,352,401 10/1982  Vitaloni .................. 180/90
4,432,565  2/1984  Suzuki et al. ............. 180/90

FOREIGN PATENT DOCUMENTS 58-22333   2/1983  Japan .
58-33327   3/1983  Japan .
58-113541  8/1983  Japan .
2083914    3/1982  United Kingdom ........ 180/90
2113164    8/1983  United Kingdom ........ 74/493

*Primary Examiner*—John J. Love
*Assistant Examiner*—Karin L. Ferriter
*Attorney, Agent, or Firm*—Burns, Doane, Swecker & Mathis

[57] ABSTRACT

A support of an automobile gauge cluster on a steering column for permitting a steering wheel to tilt up and down. The gauge cluster is provided for tilting motion in response to the tilting of the steering wheel and there is employed a bracket structure for the support of the steering column having a steering shaft rotatably extending therein. The bracket structure is rigidly connected with a portion of an automobile body structure and has a guide provided therein for guiding the tilting motion of the gauge cluster.

6 Claims, 9 Drawing Figures

AUTOMOBILE INSTRUMENT CLUSTER TILTABLE WITH A STEERING COLUMN

BACKGROUND OF THE INVENTION

The present invention generally relates to the support of an automobile instrument cluster on a steering column and, more particularly, to a mechanism for tilting the instrument cluster together with the steering column.

A number of automobiles currently available in the market have a steering wheel that can tilt up and down in front of the automobile driver occupying the driver's seat such as disclosed in, for example, Japanese Laid-open Utility Model Publication No. 52-156032, published in 1977. In this publication, only the steering column is tiltably supported with the pivot point located just above the steering gear and at the lower end of the steering column remote from the steering wheel, in order to make it easier for the driver to vary the position of the steering wheel to suit his or her build and, possibly also to vary his or her driving posture during a long drive. This publication, however, has a problem in that, unless the maximum available tilt angle through which the steering column can be adjusted is carefully selected or designed, it may happen for the driver to feel difficulty in viewing some instrument gauges and/or in manipulating some switches arranged in an instrument panel. This is because, while the steering column is permitted to tilt, the respective positions of the instrument gauges as well as those of the switches are fixed.

In view of the foregoing, attempts have been made to bring some or all of the instrument gauges, which are generally considered important, requiring the attention of the driver, together into a gauge cluster so that the latter can be mounted on, or supported by, the steering column for tilting movement together with the steering column such as exemplified by Japanese Laid-open Utility Model Publications No. 58-22333 published Feb. 12, 1983, No. 58-33327 published Mar. 4, 1983, and No. 58-113541 published Aug. 3, 1983.

According to publication No. 58-22333, the gauge cluster is shown as having its opposite, transverse ends formed integrally with respective lateral flanges which are movably received in associated guide grooves each defined in a structural member rigid with the automobile front body structure. The steering column is rigidly coupled with an elongated link assembly which is in turn pivotally coupled with an intermediate link through a connecting sleeve extending transversely of the intermediate link. A rocker arm assembly has one end pivotally supported by the front body structure and the other end loosely pivotally coupled with the gauge cluster and also has its substantially intermediate portion pivotally connected with one of the opposite ends of the intermediate link remote from the elongated link assembly. The mechanism disclosed therein is so designed and so operable that, when the steering column is tilted about the pivot point defined adjacent the lower end thereof, the motion of the steering column can be transmitted through the link assembly and then through the intermediate link to the rocker arm assembly to cause the latter to swing about the point of pivotal connection of the rocker arm assembly to the front body structure. The swing of the rocker arm assembly brings about the movement of the gauge cluster while the lateral flanges are slidingly guided along the guide grooves in a direction generally conforming to the direction of movement of the link assembly or the intermediate link. It is eventually pointed out that the connecting sleeve has its opposite ends loosely extending through fixed plate-shaped brackets rigid with the front body structure and that one of the opposite ends of the connecting sleeve which also extends through the elongated link assembly has a lock knob threadingly mounted thereon for the purpose of locking the steering column and, hence, the gauge cluster when the lock knob is turned to clamp the link assembly and the adjacent bracket together.

In the second mentioned publication No. 58-33327, the gauge cluster, which is of a generally rectangular box-like configuration, is tiltably secured to lateral brackets, rigid with the automobile front body structure, by means of two sets of paired parallel links disposed adjacent the opposite transverse ends of the gauge cluster and generally protruding forwardly from the respective brackets towards the steering wheel. More specifically, each set of the paired parallel links are pivotally connected at one end to the gauge cluster and at the other end to the associated bracket, and the gauge cluster is normally urged to tilt upwards by the action of a tension spring employed for each set of the paired parallel links, said tension spring having one end secured to the associated bracket at a point adjacent the upper link and the other end secured to the gauge cluster at a point adjacent the lower link. The lower links on respective sides of the gauge cluster are connected together by means of a connecting rod having a substantially intermediate portion operatively coupled with a depending lever extending downwardly therefrom and terminating in pivotal connection with the steering column. Thus, the tilting motion of the steering column can be transmitted to the gauge cluster through the depending lever, then the connecting rod and finally the sets of the paired parallel links.

This second mentioned publication describes that, because of the provision of the tension springs, not only can the total load imposed by the gauge cluster on the steering column be lessened, but the force required for the tilt adjustment of the steering wheel can also be lessened.

Means for locking the steering column at a selected tilt angle including a locking handle accessible to the driver is also disclosed in the second mentioned publication. However, the second mentioned publication has failed to set forth the details of the locking mechanism except for reference to only the locking handle. The drawings attached to the second mentioned publication obviously show that the locking mechanism is provided separately from, and makes no use of any part of, the linkage system between the steering column and the gauge cluster.

The last mentioned publication No. 58-113541, although reference to the adjustment in position of the gauge cluster in response to the tilting movement of the steering column has been made with no linkage system specifically disclosed, is directed to the support of the gauge cluster on an automobile dashboard or instrument panel.

A feature common to all of the disclosures made in these prior art publications discussed so far is that the gauge cluster is tiltably connected with the steering column on the one hand and with a portion of the automobile front body structure on the other hand.

SUMMARY OF THE INVENTION

The present invention has been devised to provide an improved support of an automobile gauge cluster on a steering column for permitting a steering wheel to tilt up and down, wherein the gauge cluster is mounted on and supported by the steering column for movement together therewith.

Another important object of the present invention is to provide an improved support of the type referred to above, wherein means is provided to substantially counterbalance the weight of the gauge cluster as well as the downwardly acting force exerted by the steering column so that the force necessary for a driver to tilt the steering wheel up and down can be minimized.

To this end, the support according to the present invention is of such a construction wherein the gauge cluster is provided for tilting motion in response to the tilting of the steering wheel and there is employed a bracket structure for the support of the steering column having a steering shaft rotatably extending therein. The bracket structure is rigidly connected with a portion of an automobile body structure and has a guide means provided therein for guiding the tilting motion of the gauge cluster.

Furthermore, according to the present invention, the relationship between the gauge cluster and the steering column can be maintained at all times regardless of the extent to which the steering wheel is tilted up or down because of the employment of the unique guide means. This means that the gauge cluster can be located at a position easy for the driver to view it wherever the steering wheel is tilted.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE EMBODIMENTS

Before the description of the embodiments of the present invention proceeds, it is to be noted that like parts are designated by like reference numerals throughout the accompanying drawings.

Figure 1:
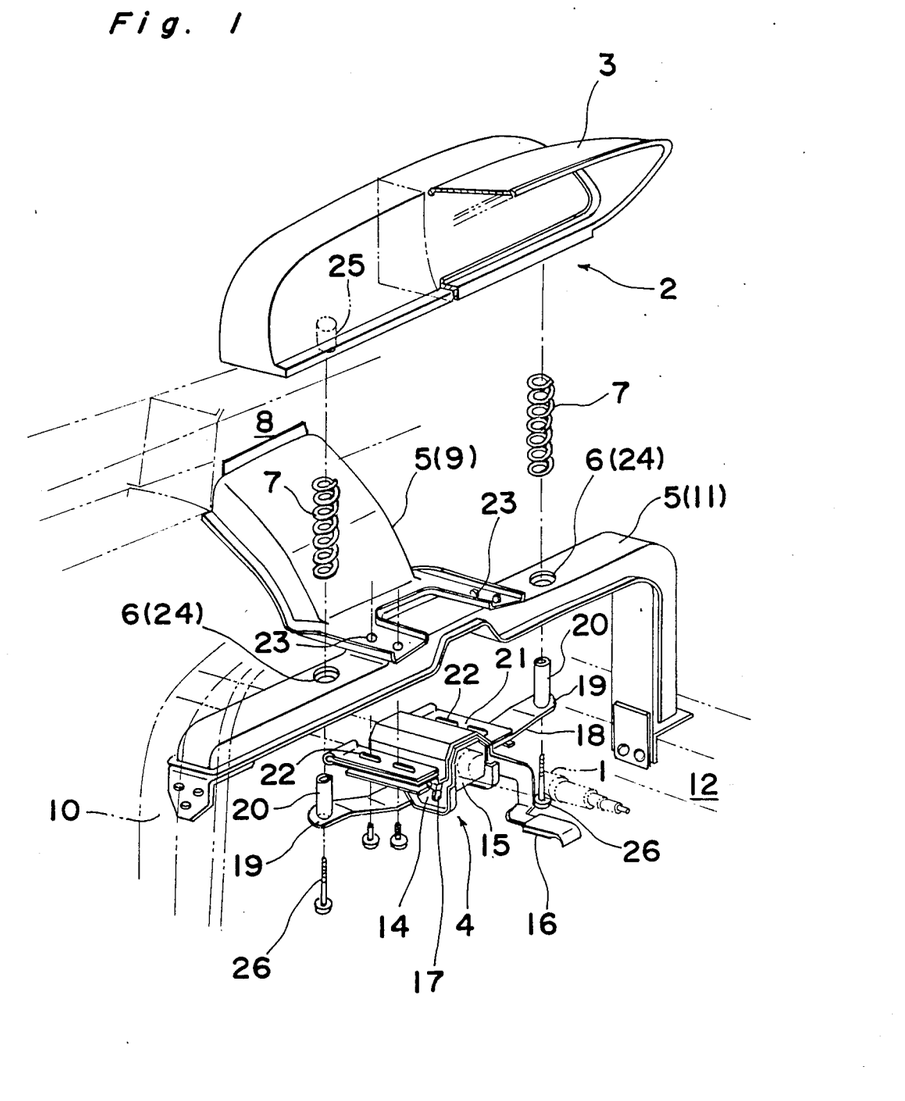
FIG. 1 is an exploded view of a gauge cluster support according to a preferred embodiment of the present invention.
Figure 2:
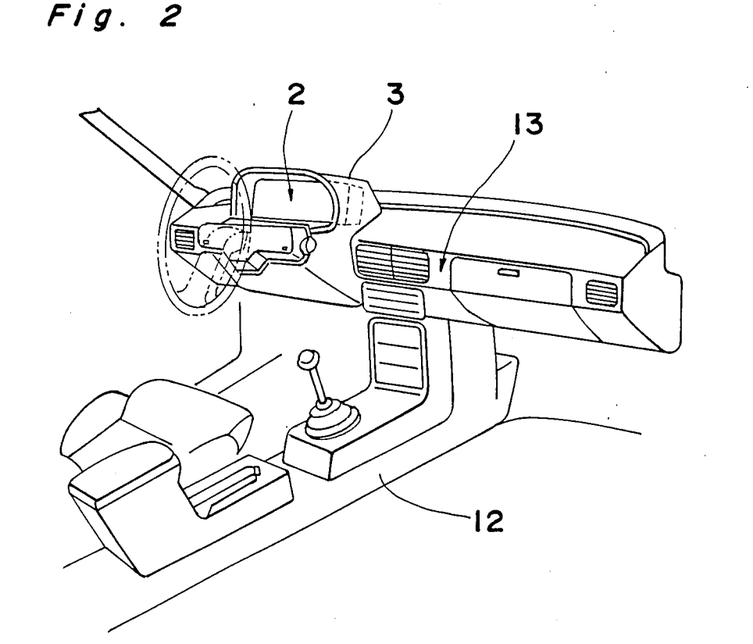
FIG. 2 is a perspective view showing an automobile instrument panel inside an automobile body structure.

Referring first to FIGS. 1 to 6, a steering wheel shown by the phantom line in FIG. 2 is mounted on one of the opposite ends of a steering shaft 1 which protrudes into the interior of an automobile body structure and towards a driver's seat. As a matter of expediency in the art, the other end of the steering shaft 1 is operatively coupled with front wheel axles through a steering gear and then through tie rods, the point of connection between the steering shaft and the steering gear utilizing a universal joint. It is this universal joint that provides the pivot point about which the steering wheel is tiltable together with a steering column 1a. As is well known to those skilled in the art, the steering column 1a supports the steering shaft 1 extending interiorly therethrough.

A gauge cluster of a generally rectangular box-like configuration is identified by 2. This gauge cluster 2 has a display face and is surrounded by a covering 3 made of plastic material. As will be described in detail later, the gauge cluster 2 is mounted on the steering column 1a by means of a tilt mechanism 4 for movement together with the steering column in a direction generally parallel to the plane perpendicular to the longitudinal axis of the steering shaft 1, said tilt mechanism 4 being in turn supported by a bracket structure 5 rigid with an automobile body structure and having a physical strength sufficient to support the steering system, including the steering shaft 1 and the steering column 1a, the tilt mechanism 4 as well as a load imposed by the gauge cluster 2. The bracket structure 5 is provided with a guide means 6 for guiding the tilting motion of the gauge cluster 2 when the steering wheel is tilted up or down.

Figure 9:
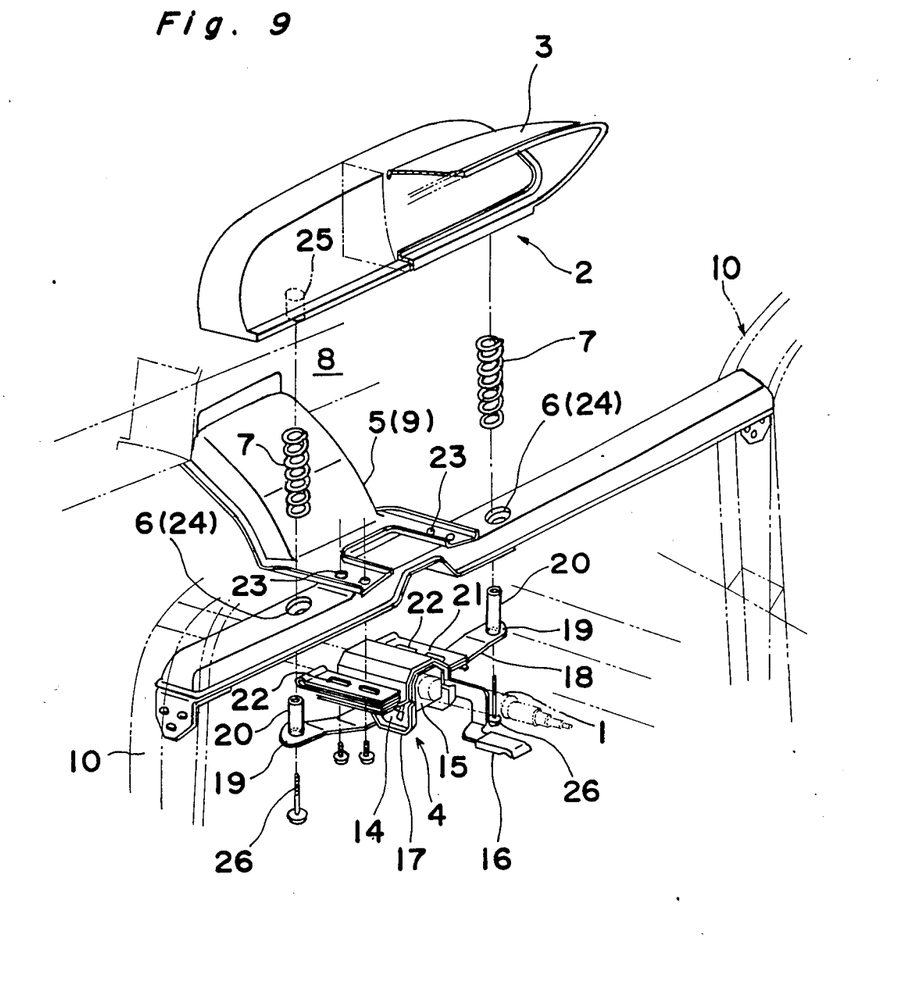
FIG. 9 is a view similar to FIG. 1, showing a modification applicable to all of the embodiments of the present invention.

More specifically, the bracket structure 5 comprises a column support frame 11, extending transversely of, i.e., in a direction widthwise of, the automobile body structure generally in parallel to a front cowl 8 for the support of an instrument panel 13, and a generally elongated bracket 9 rigidly connected at one end to the front cowl 8 and at the other end to the column support frame 11 at right angles thereto. So far shown in FIGS. 1 to 6, the column support frame 11 has one end rigidly secured to one of the opposite lateral portions of a cab side body 10, for example, a right-hand lateral portion thereof, and the opposite end bent so as to extend downwardly towards an interior floor of the automobile body structure and rigidly secured to the top of a longitudinally extending, upwardly raised floor portion 12 below which a propeller shaft (not shown) extends. Alternatively, as best shown in FIG. 9, the other end of the column support frame 11 may be rigidly connected to the other of the lateral portions of the cab side body 10, that is, the left-hand lateral portion thereof. The use of the column support frame 11 makes it possible to minimize the vibration of the steering wheel accompanying the vibration of the automobile body structure during the drive on, for example, a rough road and/or at high speed. In either case, that is, if the column support frame 11 has its opposite ends rigidly secured to that one of the opposite lateral portions of the cab side body 10 and the upwardly raised floor portion 12 as shown in FIGS. 1, 3 and 4 or if it has its opposite ends rigidly secured respectively to the opposite lateral portions of the cab side body 10 as shown in FIG. 9, the column support frame 11 is employed in the form of a channel member or a tubular member of closed cross-section and is usually disposed so as to extend beneath the instrument panel 13 without being exposed to the sight of the driver or any other passengers within the interior of the automobile as can be seen from FIG. 2.

The column support frame 11 has a substantially intermediate portion raised upwardly, which raised intermediate portion is located generally frontwardly of the driver's position for accommodating the tilt mechanism 4 from below as will be described later. The bracket 9 rigid with the front cowl 8 has the end adjacent the frame 11 forked into a pair of generally parallel fingers which are in turn rigidly secured to the frame 11, as will be described later, with the upwardly raised intermediate portion of said frame 11 accommodated within a space between the fingers of the bracket 9. As hereinbefore described, the bracket structure 5 comprised of the bracket 9 and the frame 11 is used to support the steering system, including the steering shaft 1 with the steering wheel and the steering column 1a, by means of the tilt mechanism 4 as well as the load imposed by the gauge cluster 2.

Figure 3:
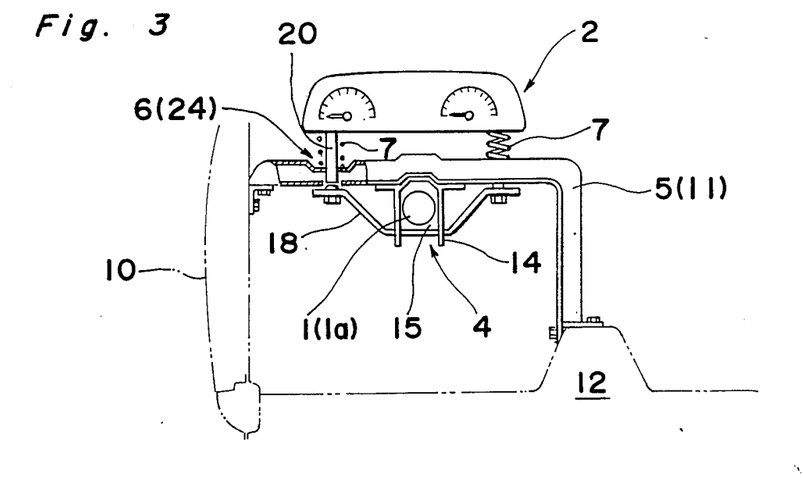
FIG. 3 is a schematic front elevational view of the gauge cluster of FIG. 1 as viewed from a driver's seat with the instrument panel removed.
Figure 4:
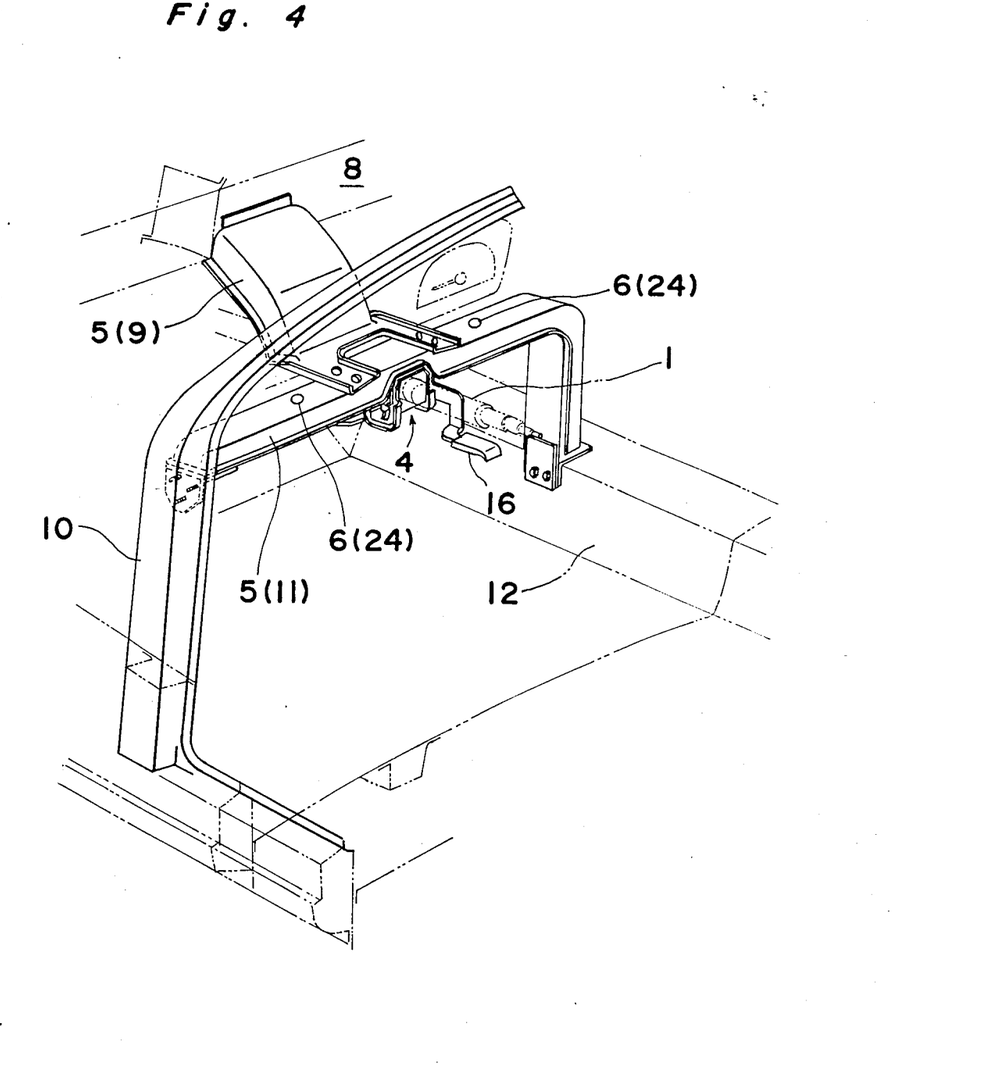
FIG. 4 is a perspective view of the gauge cluster support shown in FIG. 1 in an assembled condition.
Figure 5:
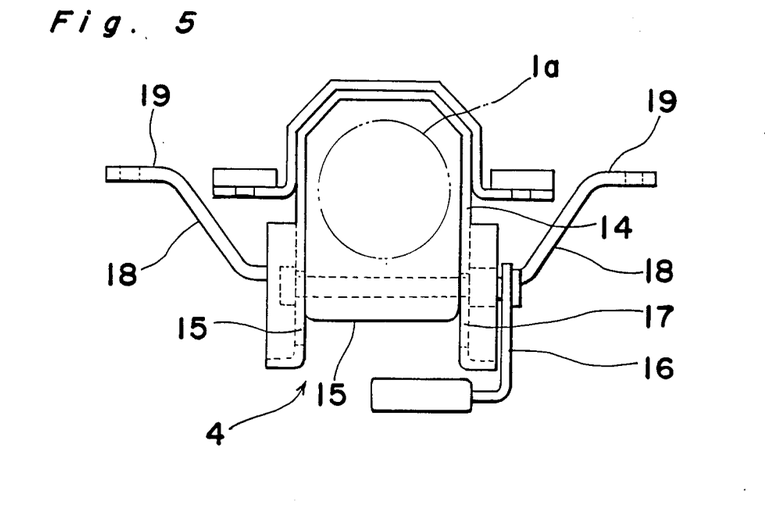
FIG. 5 is a front elevational view, on an enlarged scale, of a portion of the cluster support shown in FIG. 3.
Figure 6:
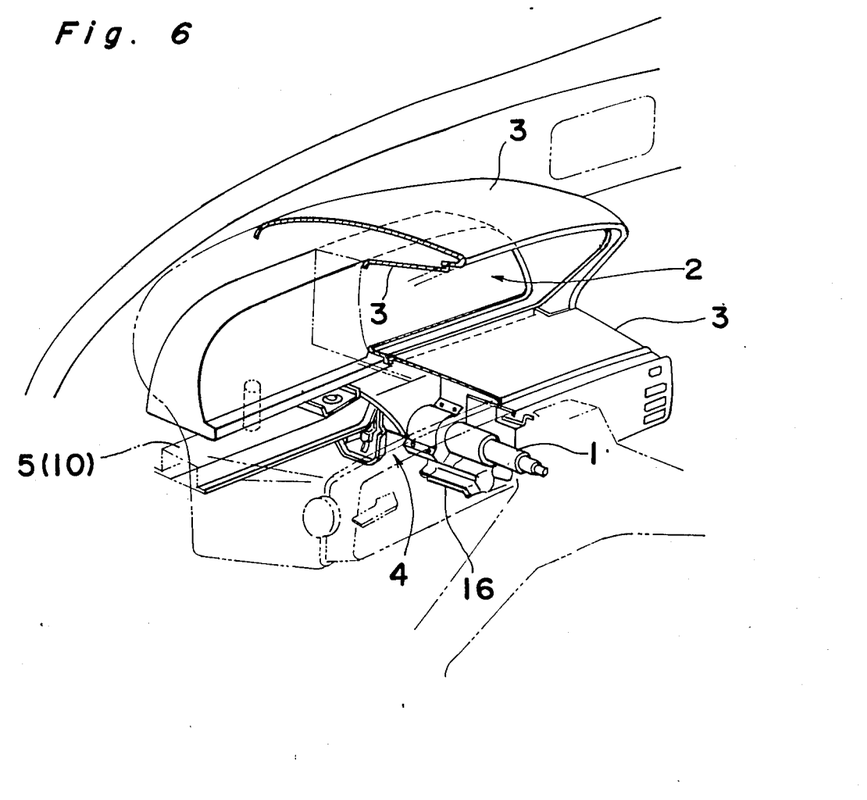
FIG. 6 is a perspective view of the cluster support showing the position thereof in relation to the instrument panel.

As best shown in FIGS. 1, 3 and 5, the tilt mechanism 4 comprises a bracket 14 of a generally inverted U-shape in section carried from above by the upwardly raised intermediate portion of the frame 11 through a flange member 21 so as to straddle the steering column 1a from above, and a slide block 15 of a cross-sectional shape similar to the cross-sectional representation of the bracket 14 and rigidly mounted on, or integrally formed with, the steering column 1a so as to permit the steering shaft 1 to pass therethrough. The slide block 15 is slidably accommodated within a space delimited within and by the bracket 14 of a generally inverted U-shape to permit the steering column 1a to tilt between up and down positions, the steering column 1a in the up position being shown in FIGS. 3 and 5. The opposite wall portions of the bracket 14 corresponding in position to a pair of spaced arms of the shape of a figure "U" are formed respectively with generally vertically extending guide slots 17 defining the available tilt angle through which the steering column 1a can tilt between the up and down positions.

The tilt mechanism 4 also comprises a tilt lever 16 having one end extending through one of the guide slots 17 and then fixedly through the slide block 15 and terminating within the other of the guide slots 17, and the other end bent to protrude towards the driver's seat for the access to the hand of the driver. This tilt lever 16 is utilized to unlock and lock the slide block 15 before and after the tilt adjustment of the steering wheel and is so designed and so operable in the illustrated embodiment that, when the tilt lever 16 is turned in either direction, a threaded member moves to protrude or retract, depending on the direction of turn of the tilt lever 16, to apply or release a clamping force necessary for the opposite wall portions of the bracket 14, respectively. Thus, when the steering column 1a is moved between the up and down positions, the first mentioned end of the tilt lever 16 is guided within the guide slots 17 and, therefore, the distance of movement of the slide block 15 within the space delimited within and by the bracket 14 and, hence, the available tilt angle referred to hereinbefore can be limited by the length of each of the guide slots 17.

The flange member 21 rigidly mounted on the bracket 14 by the use of, for example, a welding technique, has a pair of opposite flange extremities each formed with a plurality of, for example, two, spaced perforations 22. On the other hand, each of the forked fingers of the bracket 9 is formed with perforations 23 equal in number to the perforations 22 in each of the flange extremities of the flange member 21. The bracket 9 and the flange member 21 are rigidly secured to the frame 11 from opposite directions, i.e., from above and below, respectively, by means of bolts passing through the perforations 22, then through respective perforations (not shown) defined in the frame 11 on respective sides of the upwardly raised intermediate portions thereof, and finally through the perforations 23 in the bracket 9, and fastened with respective nuts. In this way, not only is the bracket 9 extending from the front cowl 8 rigidly secured to the frame 11, but the flange member 21 as well as the bracket 14 welded to the flange member 21 are also rigidly secured to the frame 11, thereby permitting the tilt mechanism 4 as a whole to be carried by the frame 11.

The slide block 15 rigid on the steering column 1a carries an arm member 18 rigidly secured, or otherwise welded, from below to the slide block 15 so as to extend laterally outwards therefrom in the opposite directions away from each other without providing any obstruction to the movement of the slide block 15 within the space in the bracket 14. The arm member 18 so secured to the slide block 15 has its opposite ends 19 positioned on respective sides of the bracket 14 and has tubular struts 20 mounted on the respective ends 19 so as to extend upwardly therefrom. These tubular struts, with the bracket 14 secured to the frame 11 through the flange member 21 as hereinbefore described, loosely extend through guide holes 24 defined in the frame 11 on respective sides of the forked fingers of the bracket 9, said guide holes 24 defined in the frame 11 on respective sides of the forked fingers of the bracket 9, said guide holes 24 forming the guide means 6 referred to hereinbefore.

The tubular struts 20 loosely extending through the guide holes 24 protrude upwardly and terminate within respective sockets 25 defined in the bottom of the gauge cluster 2, and stud bolts 26 passed through the respective ends 19 of the arm member 18 and extending through the tubular struts 19 are tapped into the gauge cluster 2 thereby connecting the gauge cluster 2 and the tilt mechanism 4 together. Thus, it will readily be seen that the tilting motion of the steering column 1a can be acccompanied by a corresponding tilt of the gauge cluster 2.

Figure 7:
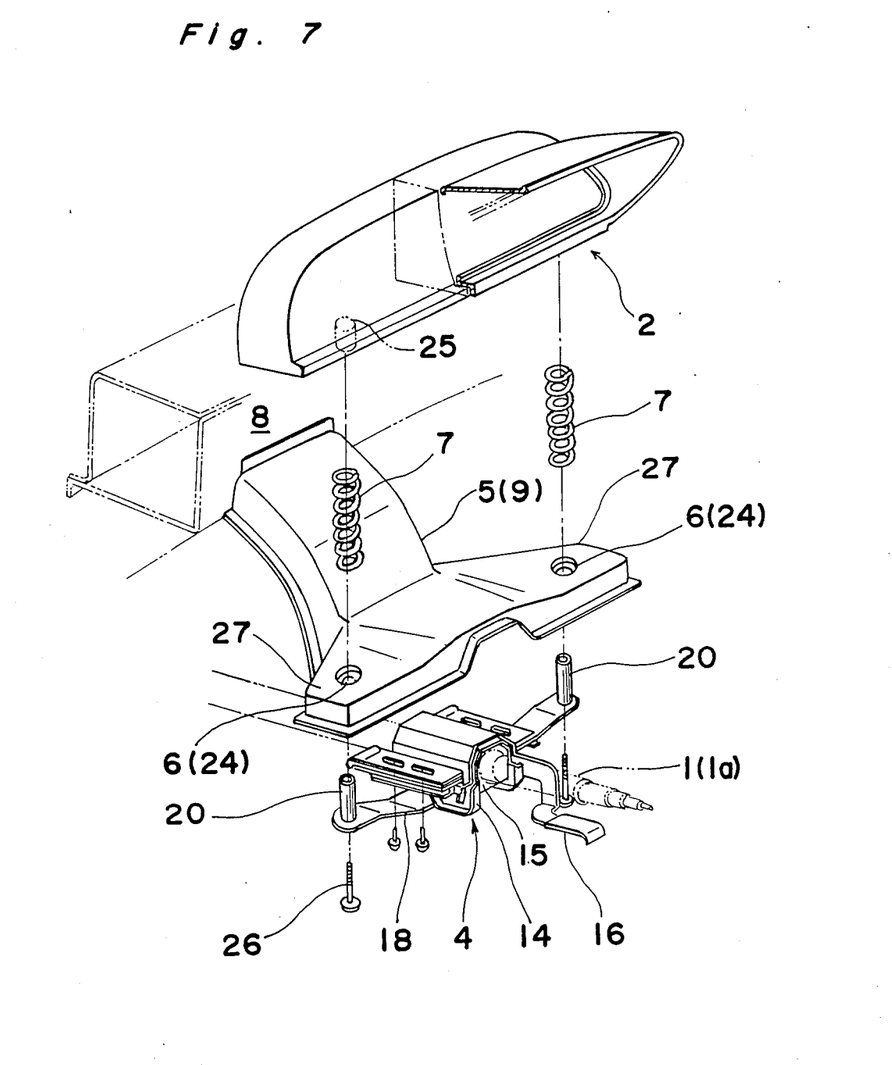
FIG. 7 is a view similar to FIG. 1, showing the cluster support according to another preferred embodiment of the present invention.
Figure 8:
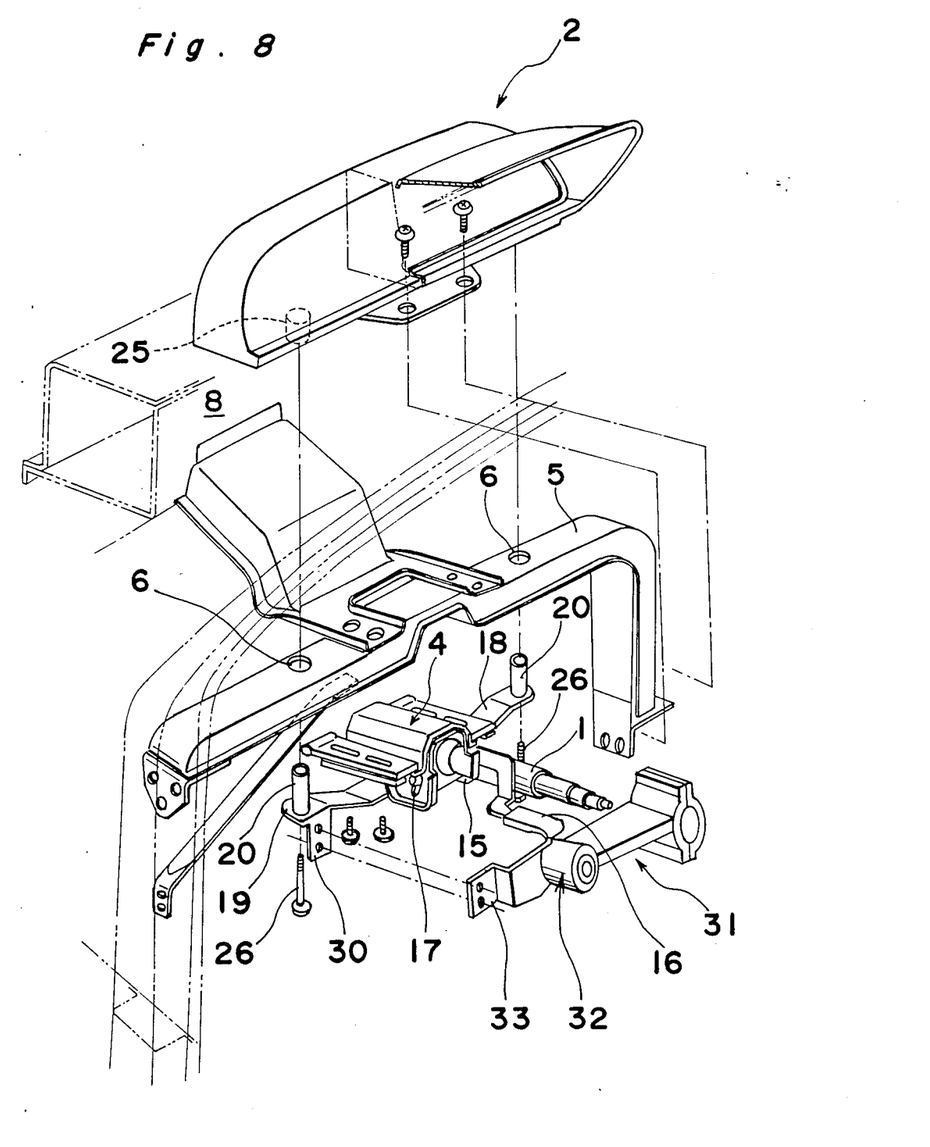
FIG. 8 is a view similar to FIG. 1, showing the cluster support according to a further preferred embodiment of the present invention.

In the construction so far described, the total weight of the gauge cluster and the tilt mechanism 4 acts on the steering column 1a and, therefore, while there will be no problem when the steering wheel is desired to be tilted down, i.e., when the steering column 1a is pivoted towards the down position, the tilt-up of the steering wheel requires the application to the steering wheel of a lifting force comparable to the total weight of the gauge cluster 2 and the tilt mechanism 4. Where this is considered undesirable or should be avoided, coiled springs 7 may be interposed between the gauge cluster 2 and the frame 11 surrounding the respective tubular struts 20 as shown in FIGS. 1 and 3 so that a substantial weight of the gauge cluster 2 as well as that of the steering system including the tilt mechanism 4 and the steering column 1a with the steering shaft 1 therein can be shared by the coiled springs 7. It is to be noted that in another embodiment which will be described later with reference to FIG. 8, no coil springs such as designated by 7 in FIGS. 1, 3 and 9 as well as FIG. 7 are employed, although the present invention represented by the embodiment of FIG. 8 is not featured in the omission of such coil springs.

In the embodiment so far described, the bracket structure 5 has been described and shown as comprised of the bracket 9 with forked fingers at one end thereof, and the column support frame 11 perpendicular to the bracket 9. However, the construction and the shape of the bracket structure 5 may not be limited to those shown and described, but the bracket structure 5 may be of a generally T-shaped configuration comprising, in addition to the generally elongated bracket 9, a transversely extending bearing body 27 having its substantially intermediate portion integral with the bracket 9 as shown in FIG. 7. In other words, the bracket structure 5 employed in the embodiment shown in FIG. 7 is of a one-piece construction including the bracket 9 and the bearing body 27, and the guide holes 24 which have been shown and described as formed in the frame 11 in the foregoing embodiment are defined in the opposite end portions of the bearing body 24. Thus, in the embodiment in FIG. 7, the tilt mechanism 4 as well as the gauge cluster 2 may be considered as supported in a cantilever fashion by the bracket structure 5 rigid only with the front cowl 8 through the bracket 9.

The operation of the tilt mechanism 4 will now be described.

Assuming that the driver of the automobile desires to change the position of the steering wheel relative to the driver's posture, the tilt lever 16 has to be turned to unlock the slide block 15 and, thereafter, the steering column 1a is to be tilted about the pivot point by lifting or lowering the steering wheel. As the steering column 1a is tilted, the slide block 15 moves up or down within the space in the bracket 14, together with the arm member 18, accompanied by a corresponding up or down movement of the gauge cluster 2 mounted on the arm member 18 through the struts 20. At this time, since both of the struts 20 are moved an equal distance during the movement of the slide block 15, the gauge cluster 2 can be moved up or down uniformly and smoothly without being laterally oscillated.

During this tilt adjustment, and particularly when the steering wheel has to be tilted up, the steering wheel has to be lifted against the weight of the steering system and that of the gauge cluster 2. However, since the springs 7 are provided between the gauge cluster 2 and the bracket structure 5, supporting a substantial weight of the steering system and that of the gauge cluster 2, the lifting force the driver has to apply to the steering wheel to lift the latter corresponds to the load the springs 7 cannot afford to support any more. Therefore, as compared with the case where no springs such as designated by 7 are employed, the lifting force required to lift the steering wheel is smaller.

When the steering column 1a has been tilted to any desired position, the tilt lever 16 has to be turned in a direction, counter to the direction required for the slide block 15 to be unlocked, to lock the slide block 15. As a matter of course, where the bracket 9 of the bracket structure 5 has its opposite ends rigidly connected to the automobile body structure, that is, one end to the front cowl 8 and the other end through the column support frame 11 to the automobile body structure, the steering wheel as well as the gauge cluster 2 can be steadily supported when the slide block 15 has been locked in the manner as hereinbefore described.

In the embodiment shown in FIG. 8, a part of the tilt mechanism 4 is utilized concurrently as part of a steering wheel lock system. For this purpose, one of the opposite ends, for example, the left-hand end 19, of the arm member 18 is integrally formed with a fixture tongue 30 depending therefrom. On the other hand, a steering lock device 31 is adapted to be fitted, as is well known to those skilled in the art, to a portion of the steering shaft 1 adjacent the steering wheel. A key cylinder device 32 used to operate the steering lock device 31 is incorporated in the same housing to that accommodating the steering lock device 31. The key cylinder device 32 has its rear face fitted with a fitting bracket 33 extending generally parallel to the arm member 18 and bolted, or otherwise riveted, to the fixture tongue 30 integral with the arm member 18.

In the construction described with reference to FIG. 8, since the intermediate portion of the arm member 18 is connected with the steering shaft 1 on the one hand and one of the opposite ends of the arm member 18 is fixed to the key cylinder device 32 of the steering lock device 31 which is in turn adapted to be fixed to that portion of the steering shaft 1 adjacent the steering wheel, not only can the gauge cluster 2 be rigidly supported, but also the relative positioning between the key cylinder device 32 and the gauge cluster 2 can be achieved easily. Moreover, any possible deviation in position relative to a cylinder bore (not shown) to be defined in a casing for the gauge cluster 2 can be advantageously eliminated, thereby rendering the system as a whole to be readily and easily assembled.

Although the present invention has fully been described in connection with the preferred embodiments with reference to the accompanying drawings, it is to be noted that various changes and modifications are apparent to those skilled in the art. By way of example, in addition to the formation of the guides on left-hand and right-hand sides of the frame 11 or the bearing body 27, an additional guide may be provided intermediately therebetween together with an associated coiled spring.

Accordingly, such changes and modifications are to be understood as included within the scope of the present invention as defined by the appended claims unless they depart therefrom.

What is claimed is:

1. A support of an automobile gauge cluster on a steering column, having a steering shaft rotatably extending therein, for permitting a steering wheel to tilt up and down, which support comprises:
   vertically extending connecting strut members provided for connecting said gauge cluster with said steering column;
   a generally elongated bracket rigidly connected at one end to a portion of an automobile body structure located forwardly of a driver's seat in said automobile body structure and extending rearwardly of the vehicle therefrom;
   a steering support bracket for supporting the steering column, said steering support bracket being connected with another end of the elongated bracket so as to extend in a widthwise direction of the automobile body structure; and,
   guide hole means provided in the steering support bracket for receiving said vertically extending connecting strut members therein to permit the gauge cluster to undergo a tilting motion in response to the tilting of the steering wheel.

2. The support as claimed in claim 1, wherein the steering support bracket has one end rigidly secured to one of the opposite portions of a cab side body and the other end rigidly secured to either of the other of the opposite portion of the cab side body and a portion of an interior floor in the automobile body structure.

3. The support as claimed in claim 1, wherein the steering support bracket has at least two guide holes defined therein in spaced relation to each other, said guide holes constituting said guide means.

4. The support as claimed in claim 1, further comprising a spring means for interconnecting the gauge cluster and the bracket structure for easing a tilt adjustment of the steering wheel.

5. The support as claimed in claim 1, further comprising a key cylinder member, and wherein said steering column has an arm member, and said key cylinder member is secured to the steering shaft and has one end secured to the arm member.

6. The support as claimed in claim 1, wherein the spring means is concentric with at least one of the connecting strut members.

* * * * *